(12) United States Patent
Venkatesan et al.

(10) Patent No.: US 7,643,637 B2
(45) Date of Patent: Jan. 5, 2010

(54) EFFICIENT CODE CONSTRUCTIONS VIA CRYPTOGRAPHIC ASSUMPTIONS

(75) Inventors: Ramarathnam Venkatesan, Redmond, WA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 10/775,797

(22) Filed: Feb. 10, 2004

(65) Prior Publication Data

US 2005/0175180 A1 Aug. 11, 2005

(51) Int. Cl.
*H04L 9/20* (2006.01)
*H04K 1/02* (2006.01)
*H04L 9/00* (2006.01)
*H04B 14/06* (2006.01)

(52) U.S. Cl. .................. 380/268; 380/43; 380/258; 380/262; 380/267; 375/245

(58) Field of Classification Search .................. 380/28, 380/37, 268, 267
See application file for complete search history.

(56) References Cited

U.S. PATENT DOCUMENTS

| | | | | |
|---|---|---|---|---|
| 4,388,643 A * | 6/1983 | Aminetzah | .................. | 380/239 |
| 4,779,266 A * | 10/1988 | Chung et al. | ................ | 370/441 |
| 4,893,339 A * | 1/1990 | Bright et al. | .................. | 380/28 |
| 5,220,568 A * | 6/1993 | Howe et al. | .................. | 714/782 |
| 5,915,027 A * | 6/1999 | Cox et al. | .................. | 380/54 |
| 6,144,740 A * | 11/2000 | Laih et al. | .................. | 380/2 |
| 6,144,744 A | 11/2000 | Smith, Sr. et al. | | |
| 6,229,897 B1 * | 5/2001 | Holthaus et al. | ............ | 380/270 |
| 6,275,965 B1 * | 8/2001 | Cox et al. | .................. | 714/755 |
| 6,543,025 B2 * | 4/2003 | Hekstra | .................. | 714/774 |
| 6,557,139 B2 * | 4/2003 | Bohnke | .................. | 714/758 |
| 6,687,375 B1 | 2/2004 | Matyas et al. | | |
| 6,714,683 B1 * | 3/2004 | Tian et al. | .................. | 713/176 |
| 6,792,542 B1 * | 9/2004 | Lee et al. | .................. | 726/1 |

(Continued)

OTHER PUBLICATIONS

Guruswami, Foundation of computer science, 2001, Proceedings, 42nd IEEE Symposium, pp. 658-667, ISBN 0-7695-1116-3.*
M. Sosnkin, G. Naumovich, and N. Memon. Obfuscation of Design Intent in Object-oriented Applications. Proceedings of the 2003 ACM workshop on Digital Rights Management, pp. 142-153, 2003.
M. Jacob, D. Boneh, and E. Felten. Attacking an Obfuscated Cipher by Injecting Faults. In Proc. of the 2002 ACM Workshop on Digital Rights Management. 15 pages.
C.S. Collberg and C. Thomborson. Watermarking, Tamper-proofing, and Obfuscation Tools for Software Protection. University of Arizona Technical Report, 2000. 34 pages.

*Primary Examiner*—Nasser G Moazzami
*Assistant Examiner*—Fatoumata Traore
(74) *Attorney, Agent, or Firm*—Lee & Hayes, PLLC

(57) ABSTRACT

A system that facilitates efficient code construction comprises a component that receives a first code and a transformation component that transforms the first code to a new code. The new code has essentially same length parameters as the first code but is hidden to a computationally bounded adversary. The first code can be designed in the noise model and appear random to a computationally bounded adversary upon transformation.

27 Claims, 13 Drawing Sheets

U.S. PATENT DOCUMENTS

| | | | |
|---|---|---|---|
| 6,829,710 B1 * | 12/2004 | Venkatesan et al. | 713/176 |
| 6,973,187 B2 * | 12/2005 | Gligor et al. | 380/28 |
| 7,051,200 B1 * | 5/2006 | Manferdelli et al. | 713/153 |
| 2002/0085716 A1 * | 7/2002 | Abdulkader | 380/205 |
| 2003/0190054 A1 * | 10/2003 | Troyansky et al. | 382/100 |
| 2003/0223579 A1 * | 12/2003 | Kanter et al. | 380/28 |
| 2004/0153941 A1 * | 8/2004 | Muratani | 714/746 |
| 2005/0135656 A1 * | 6/2005 | Alattar et al. | 382/100 |
| 2007/0016790 A1 * | 1/2007 | Brundage et al. | 713/176 |
| 2008/0046742 A1 * | 2/2008 | Moskowitz | 713/176 |

* cited by examiner

EFFICIENT CODE CONSTRUCTIONS VIA CRYPTOGRAPHIC ASSUMPTIONS

TECHNICAL FIELD

The present invention generally relates to protecting one or more code words within data from adversarial attack. More particularly, the present invention relates to hiding a code from an adversary via making the code appear random to such adversary.

BACKGROUND OF THE INVENTION

Advanced innovation in computer technology has altered how people and businesses communicate. For example, instances that previously required a handwritten letter (and subsequently several days for transportation of the letter) now require an e-mail that can be delivered to an intended recipient almost instantaneously. Pictures taken with digital cameras can be uploaded onto the Internet, thus enabling numerous friends, family, or otherwise to view such pictures at their convenience and without cost (e.g., developing cost, delivery cost, . . . ). Furthermore, songs and movies that at one time required tapes, records, disks, etc. as well as a suitable player for playback can now be generated in digital format and exist within a hard drive on a computer. Thereafter these movies and tapes can be played on the computer, as well as stored on removable media and played on external devices. When generating and transporting computer data that represent these and other similar computer objects, two considerations should be accounted for—error correction and maintaining secrecy of the data. Codes are a set of rules for converting a piece of information into another object or action.

Particular communications can be extremely valuable to those delivering messages as well as those receiving the messages. For instance, in a military context it is desirable to ensure that all tactical communications between individuals at disparate locations remains unobtainable by an adversary. Cryptography codes provided a suitable solution for these situations. Cryptography is generally understood to be a study of principles and techniques by which information is converted into an encrypted version that is difficult for an unauthorized person to read (e.g., an unauthorized person should not be able to convert the encrypted version back to the original version). However, an intended recipient must be able to obtain and read the information without a great amount of difficulty.

Cryptography keys were created to cause adversaries difficulty in obtaining secretive information. A cryptographic key is a relatively small amount of information utilized by a cryptographic code to enable encoding and decoding of secretive information. Disparate keys utilized by the cryptographic code will produce different results during encoding and decoding of information. Thus, if an adversary obtains the appropriate key(s), he can thereafter obtain the information that the key(s) were created to protect. This is because the study of cryptography assumes that an adversary thoroughly knows the cryptographic code employed to encrypt the message. Therefore the security of a cryptographic key (and the information protected by the key) requires that the key be kept secret. Symmetric key algorithms utilize a single key for both encryption and decryption of messages. Thus, if an adversary were to obtain the key, he could read secretive information as well as create and deliver false information to an unknowing recipient. Asymmetric key algorithms were then created to alleviate some of these problems by requiring one key for encryption and a second key for decryption. In an instance that an adversary discovers one of the key(s), however, the adversary can still either send false information or receive secretive information. Furthermore, several asymmetric key algorithms have been thoroughly broken, thus enabling adversaries to obtain access to secretive information. For instance, an adversary can determine a location of the key within the information, and thereafter utilize brute force techniques to obtain the key. For instance, the adversary can deliver noise to the location containing the key, causing particular bits to flip. If given sufficient time, the adversary will eventually alter correct bits at the key location to allow for encryption of the information.

Digital media (songs, images, videos, . . . ) and other desirably protected digital information can include watermarks that purportedly prevent an unauthorized user from copying and/or playing the media. For example, a digital song can include a watermark, wherein a media player will not play the song upon reading the watermark. An attacker, however, can determine a location of the watermark and deliver a noise burst to such watermark. When the media player encounters the damaged watermark, it will not be able to determine that the user is unauthorized, and will allow play and/or recording of the song.

Designing codes against adversarial attacks, however, is difficult, and these codes typically do not perform as well as codes designed against random noise attacks. Furthermore, error correction techniques (e.g., Reed-Muller codes, Reed-Solomon codes, Goppa codes . . . ) have much greater performance when random noise attacks occur upon data when compared to instances that adversarial attacks occur upon data. This is because random noise attacks are not concentrated on a particular location within a code, whereas adversarial attacks are designed to destroy the mathematical property of the code. Thus, accordingly, codes designed against random attacks (codes designed in a noise model) are associated with performance that is roughly twice better than codes designed against adversarial attacks (codes designed in an adversarial model), as error detection and correction codes are well equipped to detect and recover data altered due to random noise.

In view of at least the above, there exists a strong need in the art for a system and/or methodology that provides for improved cryptography properties and error-correction properties in light of an adversarial attack on such code.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and/or methodologies that can achieve benefits of codes designed with respect to random noise attacks while utilizing such codes in the presence of an adversary. Currently there exists a plurality of codes that are designed in the noise model (e.g., designed knowing that the codes would be subject to random noise attacks but not adversarial attacks) that operate with a high level of performance. The present invention utilizes these known noise model codes and transforms such codes to enable them to be associated with a high level of performance when employed in the presence of an adversary that is attacking the code. The present invention essentially hides the noise model codes so that an adversary cannot determine where within the code to attack in order to obtain a desired result (e.g., destruction of the code).

More particularly, the present invention utilizes a first code that is designed within the noise model, and performs various algebraic transformations on such first code to create a second code. For example, one or more pseudo-random functions can be employed to transform the first code into the second code. Upon transforming the first code into the second code, the second code will appear to be random to a computationally bounded adversary. Therefore an adversarial attack on the second code will essentially by a noise attack on the first code, as the attack will be randomly distributed across the first code. Randomly distributing the attack across the first code allows the code to act as it was designed—with respect to random noise. Thus the first code can be associated with error correction/detection properties when random noise is applied to the first code.

In accordance with one aspect of the present invention, an encoder can receive a sequence of messages to encode and relay to a desired recipient that is associated with a decoder. A pseudo random number generator can be provided that effectively randomizes the messages with respect to a computationally bounded adversary via generating a plurality of pseudo-random numbers based upon a location of a message within the sequence of messages. These pseudo-random numbers can be employed in connection with the encoded message to hide the message from an adversary. The encoder and the decoder can be synchronized, so that the decoder also knows the location of the message within the sequence of messages. From such information the decoder can decode the message that appears to be random to a computationally bounded adversary.

In accordance with another aspect of the present invention, an encoder and decoder do not have to be synchronized in order to hide a code from a computationally bounded adversary. Rather, synchronization information can be embedded within the encoded message in a plurality of secret locations. The decoder can know a location of the secret locations, and obtain the synchronization information from such code. Furthermore, a seed employed by a pseudo random generator to generate a plurality of pseudo-random numbers (that appear truly random to a computationally bounded adversary) can be embedded within the encoded code. The pseudo random numbers can utilized in connection with the encoded code, which makes a message and/or a sequence of messages appear completely random to an adversary. A secret key can be provided to the decoder that enables the decoder to obtain an identity of the seed, and thus obtain the hidden message(s).

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
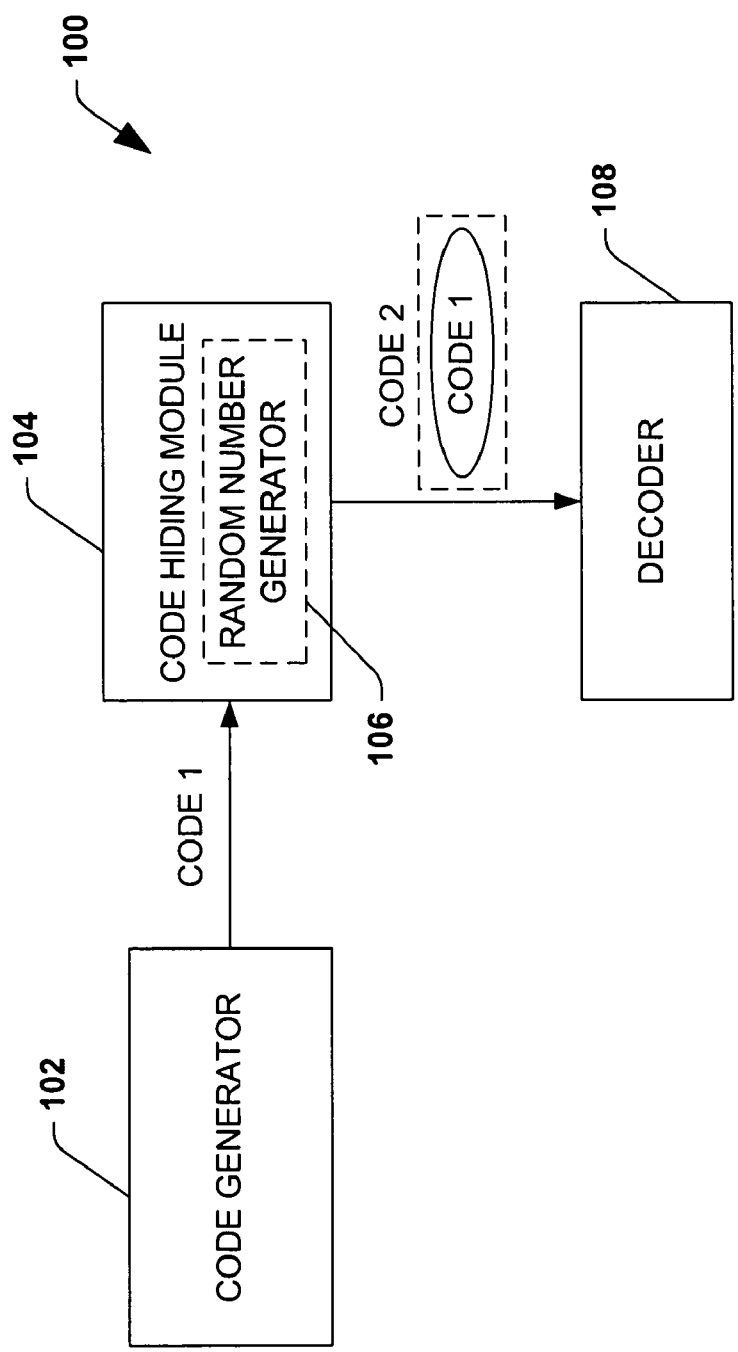
FIG. 1 is a block diagram of a system that facilitates hiding a code form a computationally bounded adversary in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Turning now to FIG. 1, a system 100 that facilitates utilization of code that performs in an adversarial model with substantial similarity to code generated in a noise model is illustrated. Regarding code designed in the noise model, it is assumed that errors that occur within the code are random, and that an adversary doesn't exist. Thus, errors (e.g., alteration of bits) typically occur with enough distance between disparate errors to enable the code to detect and correct such errors with high probability. When designing codes in the adversarial model, an assumption is made that an attacker is attempting to corrupt a particular set of bits (e.g., altering of particular bits will destroy a data package that utilized the code for error detection/correction). Accordingly, designing code in the adversarial model is much more difficult than designing code in the noise model, and typically, codes designed in the adversarial model do not perform as well as codes designed in the noise model with respect to error detection/correction. Furthermore, there currently exist numerous codes designed in the noise model that operate effectively in the presence of noise. The system 100 enables codes that are designed in the noise model to be effective in the presence of an adversary.

The system 100 includes a code generator/encoder 102 that creates a code 1 designed in the noise model. Code 1 is intended to refer to encoded data as well as error detection/correction codes, such as Goppa codes, Reed-Solomon codes, etc. Code 1 can include a linear code or other suitable code as is known in the art. Code 1 is delivered to a code hiding module 104 that includes a random number generator 106. The code hiding module 104 effectively hides code 1 via randomizing data that employs code 1, thereby not enabling an adversary to determine a location of critical bits to attack. More particularly, the code hiding module 104 utilizes the random number generator 106 to perform algebraic transformations on data utilizing code 1. A code 2 results from these algebraic transformations, wherein the code 2 is a transformed version of the code 1. Code 2, which is a randomized representation of code 1, can be lengthened somewhat to ensure that an attacker will not be able to determine which bits are critical bits in code 1. It is to be understood, however, that the length parameters of code 1 and code 2 will be substantially similar. Enabling code 2 to have essentially the same length parameters as code 1 is beneficial in that adding length code can slow transfer speed on a network (e.g., the Internet).

Code 2 is then received by a decoder 108 that can decode code 2 and determine the code 1. Thus, code 2 can be viewed as a protective wrapping of code 1 as illustrated with respect to FIG. 1. The decoder 108 has access to algorithms utilized by the code hiding module 106, and can thus decode code 2 and determine code 1. Furthermore, if an adversary had directed an attack on code 2, upon decoding such adversarial attack would appear as a noise attack on code 1. Thereafter, as code 1 includes algorithms utilized to correct noise errors with high probability, such errors are corrected with a high success rate when compared to conventional codes designed in the adversarial model.

In accordance with one aspect of the present invention, the random number generator 106 can be a pseudo random number generator, and the communication path between the encoder 102 and the decoder 108 can be a polynomially bounded channel. Outputs of a pseudo random number generator utilized in connection with the present invention should not be distinguishable from truly random bits except as a random guess with probability $$\frac{1}{2} + \varepsilon(v),$$

where v is a length of a seed to the random number generator 106 and $\varepsilon(v)$ is a rapidly vanishing function. Seeds are commonly utilized in connection with random number generators, and discussion thereof is omitted for sake of brevity.

Furthermore, in an instance that the random number generator 106 is a pseudo random number generator, a polynomially bounded Turing machine (not shown) should not be able to determine that the random number generator 106 is utilizing pseudo random numbers in connection with hiding code 1. Rather, the numbers output by the random number generator 106 should appear to be naturally random to the Turing machine.

In accordance with another aspect of the present invention, the code generator 102 and the decoder 108 can be primitively synchronized to enable decoding of code 2 (which hides code 1) generated by the code hiding module 104. For instance, code 1 can include a series of encoded messages received in a particular order, and the code generator 102 can relay code 1 to the code hiding module 104. The decoder 108 knows the particular order of the messages. Such synchronization facilitates encoding and decoding of code 2. In accordance with another aspect of the present invention, synchronization information can be generated randomly utilizing a small seed and a secret key and be embedded within code 2. A plurality of secret locations can be determined to hide the synchronization information. Thus the decoder 108 is not required to know an order of messages as created by the code generator 102. A more detailed explanation of synchronizing the code generator 102 and the decoder 108 as well as embedding synchronization information directly into code 2 is given supra.

Figure 2:
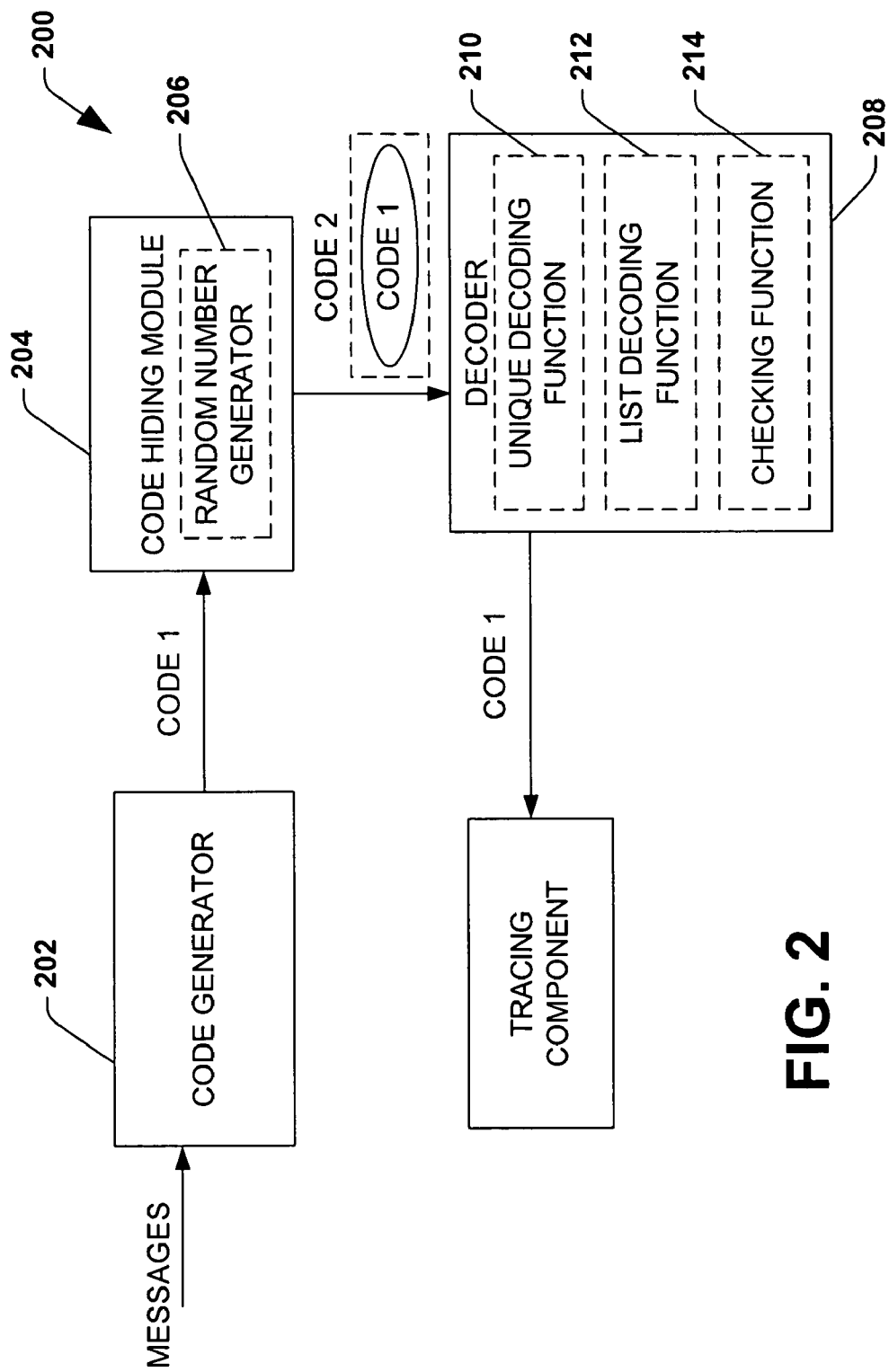
FIG. 2 is a block diagram of a system that facilitates hiding a code form a computationally bounded adversary in accordance with an aspect of the present invention.

Turning now to FIG. 2, a system 200 that facilitates hiding a code designed in noise model is illustrated. Hiding the code designed in the noise model enables the code to perform effectively in presence of adversarial attacks (e.g., an adversary will not be able to determine which bits within the code require altering to disable operation of and/or destroy such code). The system 200 includes a code generator 202 that generates code designed in the noise model (e.g., code 1), wherein code 1 includes one or more encoded messages. In accordance with one aspect of the present invention, code 1 employs one of a family of codes defined over a finite alphabet $\Sigma$ with a length parameter n. The code generator 102 receives one or more input messages m, wherein m is a word of length k over the alphabet $\Sigma$. The code generator 202 can include a coding function $f(m)$ that outputs a code word c with a length of n over the alphabet $\Sigma$. Code 1 is thus a set of $f(\Sigma^k)$. The Hamming distance between any two code words $c_1$ and $c_2$ within code 1 is at least a distance d. A rate (a ratio between a length of a message m prior to encoding via the code generator 202 and after encoding via the code generator 202) can be defined as $$R = \frac{k}{n}$$

and a relative minimum distance can be defined as $$\delta = \frac{d}{n}.$$

Code 1 is thereafter relayed to a randomizer 204 that hides code 1. Hiding code 1 enables messages encoded by the code generator 202 to be cryptographically secure while providing additional benefits in connection with error correction/detection. More particularly, a random number generator 206 generates a plurality of random numbers, and utilizes such numbers to rearrange code 1 into code 2, a randomized version of code 1. Thus, an adversary desiring to attack one or more particular code words of code 1 will not be able to determine where within code 2 to attack to reach the desired code words within code 1. Furthermore, any adversarial attack on code 2 will essentially be a random noise attack on code 1. In accordance with one aspect of the present invention, the random number generator 206 can be a pseudo-random number generator, wherein a polynomially bounded Turning machine will not be able to differentiate between numbers output by the pseudo random number generator and truly random numbers. Furthermore, the pseudo random number generator can be cryptographically secure and be associated with a plurality of cryptographically secure pseudo-random functions. For example, a secret key can correspond with a pseudo-random function employed by the pseudo random number generator. Disparate keys will correspond with different pseudo random functions. Given this plurality of pseudo random functions, in an instance that an adversary chooses a random key, such adversary will not be able to distinguish values output via the selected pseudo-random function from values of a truly random function.

A channel or Jamming function J can be employed to alter one or more code words in code 1 via code 2. For example, the Jamming function J can be random noise and/or adversarial noise directed at code 2 to alter one or more code words within code 1. The function $J(c)=\tilde{c}$ shows that an alteration of code word c results in an altered code 2 word $\tilde{c}$. A decoder 208 receives code 2 and determines contents of code 1. The decoder 208 can include a unique decoding function 210 and a list decoding function 212. The unique decoding function 210g can utilize the altered codeword $\tilde{c}$ as an input and output the original codeword c whenever $$d(c, \tilde{c}) < \frac{d}{2}.$$

The list decoding function (also designated as g) 212 can utilize the altered codeword $\tilde{c}$ as an input and output a list of code words L that contain c. A decoding failure exists in an occurrence that $g(J(f(m))) \neq f(m)$ or $g(J(c)) \neq c$. If g outputs a list of code words L, then a decoding failure exists when $c \notin g(\tilde{c})$. Unique decoding and list decoding functions are known in the art, and further discussion relating thereto is omitted for sake of brevity. The decoder 208 can further include a checking function 214h that indicates whether code 1 remains a valid code upon decoding. For example, $h: \Sigma^n \to \{0, 1\}$ can be an indicator function for code 1, wherein $h(c) \neq 0 \Leftrightarrow c \notin C$. Furthermore, h can output a vector, in which case $h(c) \neq 0$ would mean that h(c) is a non-zero vector and that code 1 is invalid. A good family of code is when the rate R=a constant greater than zero and the minimum distance δ is a constant greater than 0 as the length n approaches infinity.

Upon decoding code 2 to retrieve code 1, a tracing component 216 can determine whether a user accessing the code is a valid user. If the user is not a valid user, the tracing component 216 can further determine an individual who colluded with the invalid user. For example, intellectual property in a digital format (e.g., mp3 files, picture files, video files, . . . ) often includes watermarks or other suitable security mechanism that can be reviewed by a digital media player or image viewer. In accordance with one aspect of the present invention, each digital media file can have a unique watermark embedded therein, wherein the watermark is associated with a particular user. A database can be generated that indexes disparate media file types, and such database can be accessed upon a media player receiving a request to play/copy/transfer a particular digital media file. If the watermark does not correlate to an authorized user of the file, then the media player can refuse to play/copy/transfer the file. Furthermore, the media player can determine from the database an identity of the authorized user who colluded with the unauthorized user to illegally copy the digital media file. Conventional systems are not capable of robust tracing, as sophisticated users would direct attacks at a watermark until the media player would no longer recognize such watermark. As an adversary would be attacking a randomization of the digital media file, however, such adversary would be unable to determine a location of the watermark. Furthermore, if the adversary attempted an attack on the randomized code, he would be risking ruining at least a portion of the file that he is desirably playing/copying/transferring.

Figure 3:
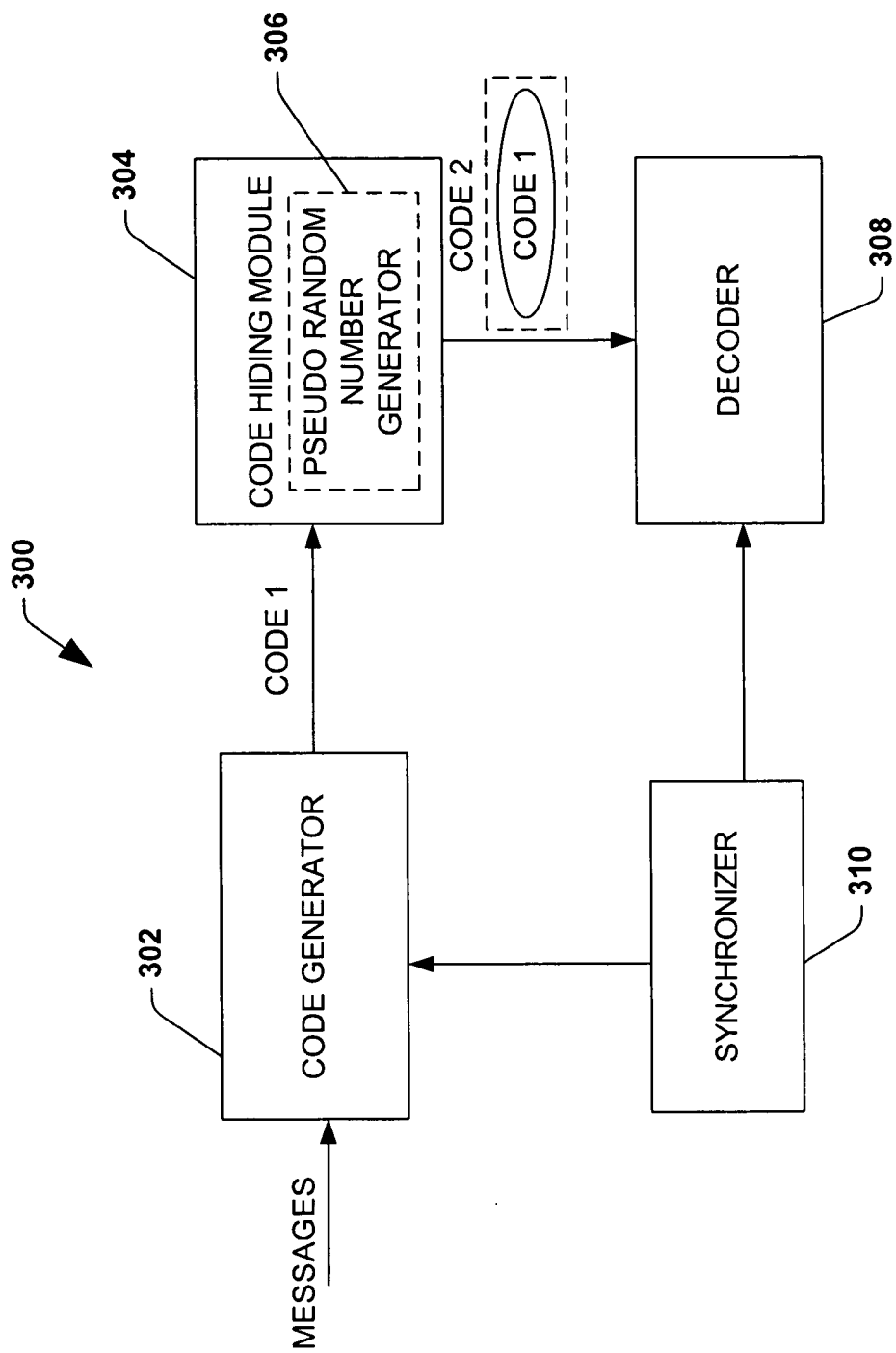
FIG. 3 is a block diagram of a system that facilitates hiding a code form a computationally bounded adversary in accordance with an aspect of the present invention.

Now referring to FIG. 3, a system 300 that facilitates hiding a code (e.g., code 1) designed in the noise model via randomizing the code is illustrated. The system includes a code generator 302 that generates a code 1 designed in the noise model. Code 1 is then relayed to a code hiding module 304 that facilitates randomizing code 1, thereby hiding code 1 from potential and/or actual adversaries. In accordance with one aspect of the present invention, code 1 is on a field of size q, and each field element is referred to as a bit. Code 1 has a minimum Hamming intra-code distance of d bits. When transferred on an adversarial channel, code 1, which includes one or more error correcting/detecting techniques, is capable of correcting an attack of weight $$\frac{d-1}{2}.$$

When transferred on a channel that does not include an adversary but only noise, however, more errors can be corrected with high probability of correction (e.g., noise with a greater weight is acceptable).

More particularly, the code generator 302 includes an encoding function f that encodes a plurality of messages into code 1. Thus, code 1 is generated based upon a sequence of t messages $m_1, m_2, m_3, \ldots, m_i, m_{i+1}, \ldots, m_t$, where each message m is k bits in length. The code generator 302 therefore generates code 1 via sequentially encoding each message (e.g., $f(m_i)$). The code hiding module 304 receives code 1 in a sequence of $f(m_1), f(m_2), \ldots f(m_i), \ldots f(m_t)$, and via utilizing a pseudo random number generator 306 generates two pseudo random numbers of n bits, a and b for each encoded message, where $a \neq 0$. These pseudo random numbers are generated based upon a position within the sequence of each encoded message m. The code-hiding module 304 also utilizes the pseudo random generator 306 to generate a random permutation σ to permute n bits. The code-hiding module 304 can then send $a \times \sigma(f(m_i))+b$ (e.g., code 2), where × is a bitwise multiplication operator, over a channel and to a receiver that includes a decoder 308. While resident within the channel, a noise vector can be added to code 2. For example, a vector v (adversarial in nature) of Hamming weight w can be added by to code 2 by the channel. Therefore the decoder 308 receives $a \times \sigma(f(m_i))+b+v$.

A synchronizer 310 is employed to synchronize the code generator 302 with the decoder 308, thereby enabling the decoder 308 to know the sequence of messages. As the decoder 308 will have knowledge of i for each message m encoded by the encoding function f, the decoder 308 can compute a, b, and σ. Thus, the decoder 308 can compute $f(m_i)+\sigma^{-1}(a^{-1} \times v)$, where $a^{-1}$ is a bitwise inverse of a. It is to be noted that the weight of the vector v remains w. Moreover, the vector $\sigma^{-1}(a^{-1} \times v)$ is a random vector chosen uniformly from all the length n vectors of weight w. Such is true because a uniformly chosen random vector b is added during encoding, making the string completely random and hiding all remaining encoding. Furthermore, as a and σ are chosen prior to the vector v being added to the channel, they cannot depend upon v. Likewise, v is not dependent upon either a or σ. Bitwise multiplication with $a^{-1}$ generates uniform non-zero values for each non-zero value of v. Permuting by $\sigma^{-1}$ disperse these non-zero values to random positions. As $\sigma^{-1}(a^{-1} \times v)$ is shown to be a random vector, it can be assumed that the vector v is a random vector, and that random noise (rather than an adversarial attack) of weight w has been added. As the vector v is random noise, the weight w can be greater than $$\frac{d-1}{2}$$

and still enable correcting of error with high probability.

Figure 4:
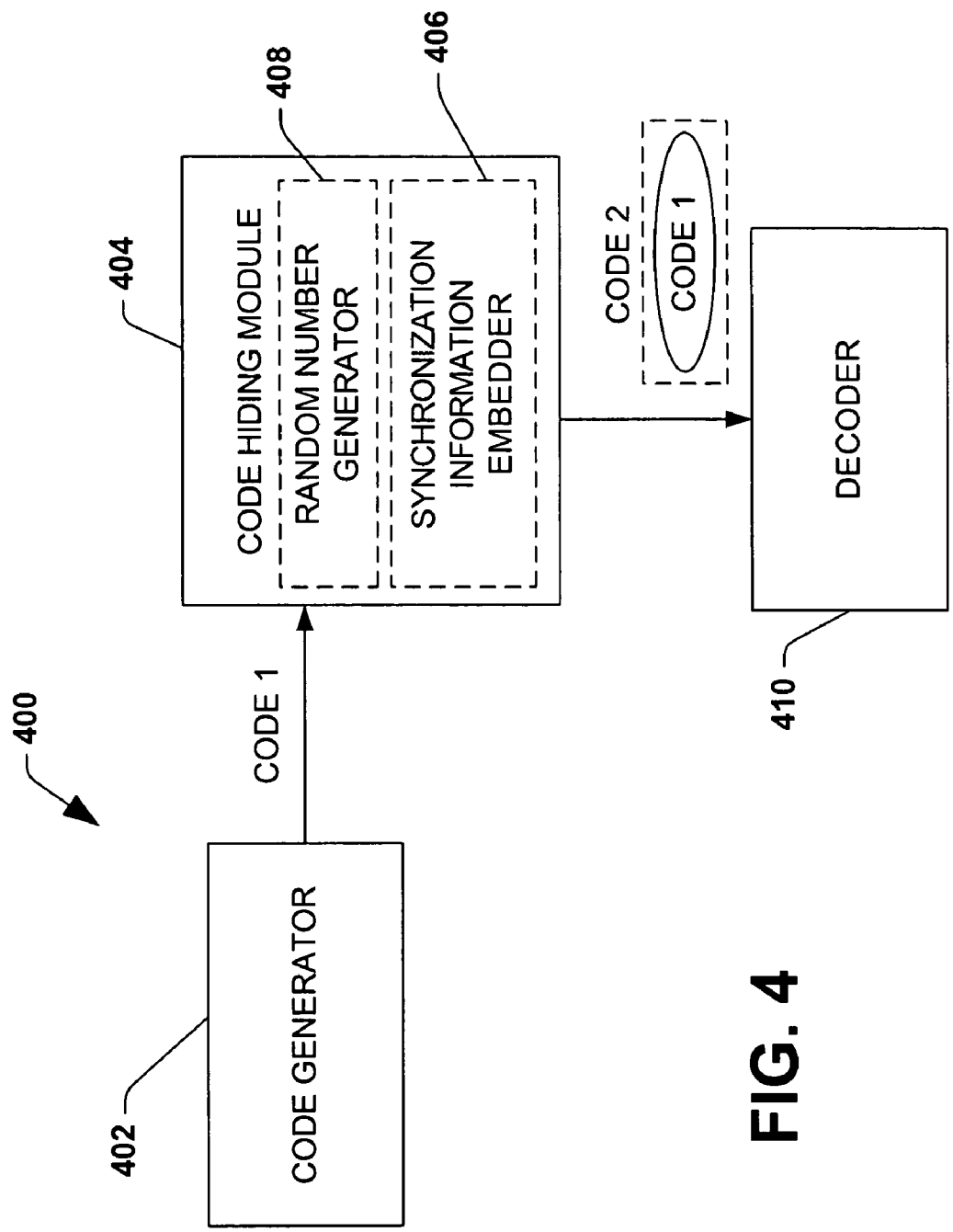
FIG. 4 is a block diagram of a system that facilitates hiding a code form a computationally bounded adversary in accordance with an aspect of the present invention.

Now referring to FIG. 4, a system 400 that facilitates hiding a code (e.g., code 1) designed in the noise model via randomizing the code is illustrated. Rather than synchronize a code generator and a decoder as illustrated in FIG. 3, the system 400 generates synchronization information randomly utilizing a seed value and a secret key, and storing the seed value within a hidden code word. In accordance with one aspect of the present invention, the secret key is known only to authorized recipients of code. The system 400 includes a code generator 402 that generates code (code 1) designed in the noise model. In accordance with one aspect of the present invention, code 1 can be an efficient encodable and list-decodable code. Furthermore, code 1 does not have to be associated with a particular rate. For example, a poly-logarithmic rate (e.g., $$\frac{1}{\log n^{(1)}}$$

can be utilized in connection with the present invention. Code 1 can be delivered to a code hiding module 404 that can randomize the code to effectively hide such code from an adversary while retaining similar length parameters. The code hiding module 404 can include a synchronization information embedder 406. For instance, code 1 can have a length $n_l$, and the code hiding module 404 can choose $n_l$ secret locations within resulting hidden code (e.g., code 2) to hide synchronization information (e.g., tag code). This plurality of secret locations is hereafter referred to as tag locations.

The code hiding module 404 can utilize a pseudo random number generator 408 to create a random seed s. Thereafter the pseudo random number generator 408 can generate two pseudo random numbers of n bits, a and b, as described with respect to FIG. 3. Similarly, the pseudo random number generator 408 can create a random permutation σ and code 1 can be encoded as described above with respect to FIG. 3, except that the code hiding module 404 can encode the seed within code 1 and place resultant code words generated by the encoding function ƒ at the $n_l$ secret tag locations. These $n_l$ secret tag locations are known to a decoder 408 that receives code 2. Similar to the system 300 (FIG. 3), in an event that an adversary attempts to attack one or more code words within code 2, such an adversary can only add a random vector v of weight w to the code word. It is to be understood, however, that a fraction of the random noise can affect the bits at the tag locations. The tag code, however, has a higher relative distance than code 1, so the decoder 410 can list decode the tag codes and obtain a list of secret seeds. A correct secret seed will result in as many random errors as added by the vector v. An incorrect seed will result in a substantial amount of errors.

Figure 5:
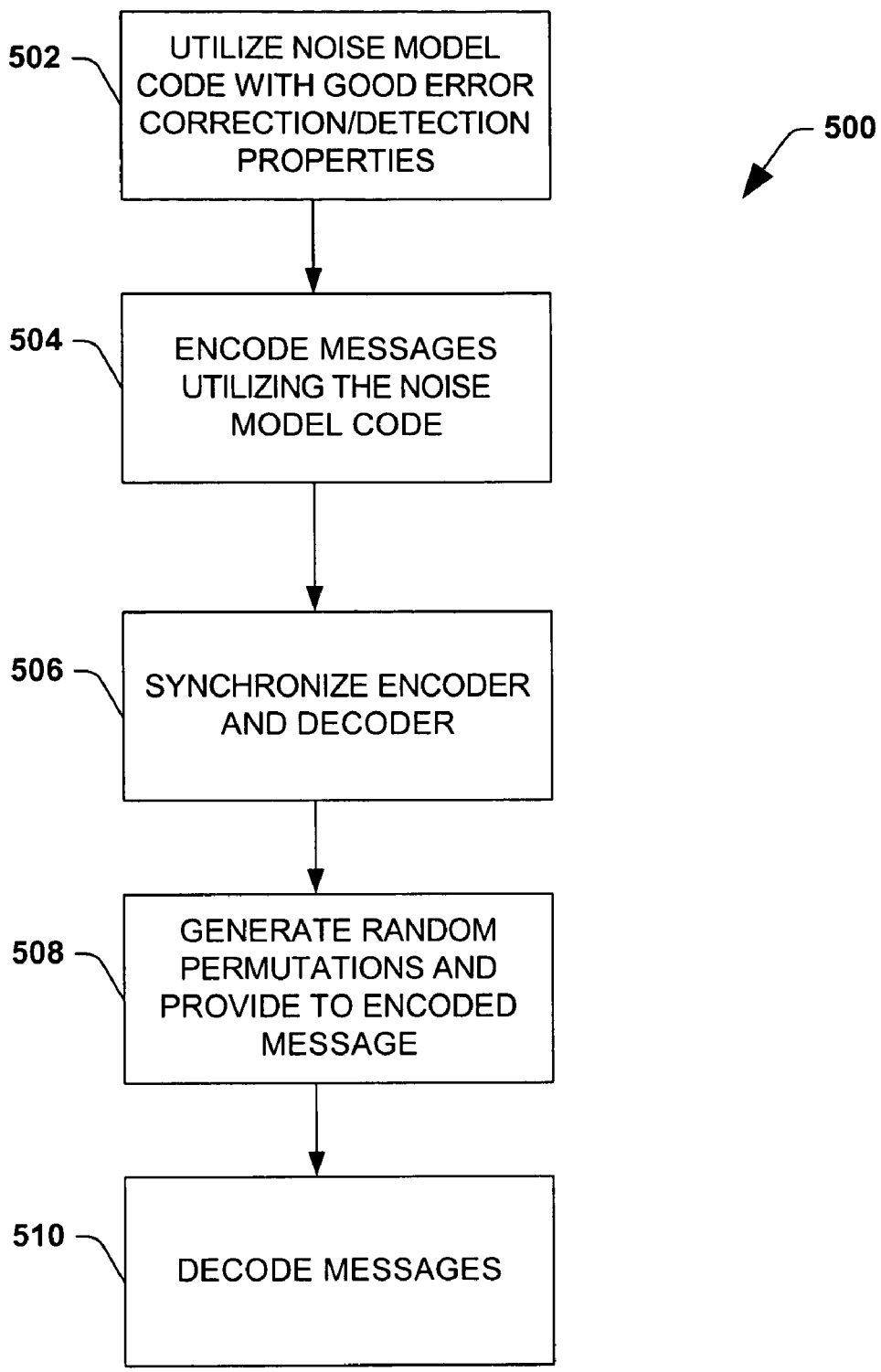
FIG. 5 is a representative flow chart of a methodology for hiding a code from a computationally bounded adversary in accordance with an aspect of the present invention.

Now referring to FIG. 5, a methodology 500 for hiding data that is encoded via a code designed for error correction and detection purposes within the noise model (e.g., designed with an assumption that no adversarial attacks would be directed at data encoded via the code). While, for purposes of simplicity of explanation, the methodology 500 is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 502, a noise model code that is associated with suitable performance with respect to error correction and detection is selected. For example, linear codes, Goppa Codes, Reed-Solomon codes, and other suitable codes can be selected to encode a particular sequence of data. More particularly, the selected code(s) can be of a family of codes over a finite alphabet Σ with a length parameter n. At 504 a sequence of messages are encoded utilizing the selected code. For example, the selected code can be employed to encode one or more input messages m, wherein m is a word of length k over the alphabet Σ. Furthermore, the selected code can include an encoding function ƒ(m) that outputs a code word c with a length of n over the alphabet Σ. The encoded data is thus a set of ƒ($\Sigma^k$). The Hamming distance between any two code words $c_1$ and $c_2$ within the encoded code is at least a distance d. A rate can be defined as $$R = \frac{k}{n}$$

and a relative minimum distance can be defined as $$\delta = \frac{d}{n}.$$

In one particular example, the codes can be a simple linear code. For instance, Σ can be some finite $F_q$ and the set of input messages m can be a vector space of dimension k over $F_q$. The encoding function ƒ(m) can be a k×n generator matrix G. A parity check matrix can also be employed in connection with the selected code.

In accordance with one aspect of the present invention, a message sampling algorithm M can produce the messages m (e.g., M queries the encoding code with a message and it reviews a corresponding code word). An adaptive (adversary) M can produce a sequence of code words wherein each new message depends upon previous messages and corresponding code words. An code with parameters of n (length of code words output), k (length of messages prior to encoding), and d (minimum Hamming distance between two code words)

can be referred to as (T, q, ε) unlearnable if an adaptive adversary M with runtime T(n) after making q queries can not distinguish a new output code word from a random code word with probability better than ε. An (n, k, d)-linear code has a pseudo-minimum distance d* with parameters (T, q, ε) in an instance that any M with runtime T(n) after q queries cannot produce a corrupted code word within distance $$\frac{d^*}{2}$$

to a nearest code word that causes a decoding failure with probability better than ε.

Moreover, an encoding function can be associated with a cryptographically secure pseudo random number generator and/or a family of pseudo-random functions. Outputs of the pseudo random number generator utilized in connection with the present invention should not be distinguishable from truly random bits except as a random guess with probability $$\frac{1}{2} + \varepsilon(v),$$

where v is a length of a seed to the random number generator 106 and ε(v) is a rapidly vanishing function. Seeds are commonly utilized in connection with random number generators, and discussion thereof is omitted for sake of brevity. Moreover, existence of a family of cryptographically secure pseudo-random functions indexed by a secret key, wherein if a user chooses one of the family of pseudo-random functions, then the adaptive adversary M cannot distinguish values output from the pseudo-random function from truly random values.

In accordance with another aspect of the present invention, equivalents of a particular code that provide benefits with respect to decoding can be employed in connection with the present invention. Two codes are considered equivalent if one can be obtained from another utilizing coordinate alteration (e.g., left multiplication on a generator matrix) and permutation of coordinates (e.g., acting via right multiplication). A code equivalence problem is to determine if two given codes are equivalent. It is also to be noted that codes chosen at random possess excellent minimum distance properties, but decoding such codes can be difficult. More particularly, decoding linear codes is considered hard. Thus, in conventional systems, Goppa codes have been disguised as an equivalent to random linear codes. For example, let F(S, G, P)=Ĝ:=SGP, where G is a k×n generator matrix of Goppa code, S is a random k×k invertible matrix and P is a (n×n) permutation matrix. It can be determined that G and Ĝ describe a substantially similar code. For example, Ĝ can be a public key for a first user, and S, G, and P are private keys for the first user. If a second user wants to send a message m to the first user, the second user typically can send c=mĜ+e, where e is a random vector of weight εn, and ε is a parameter large enough so that computing c ↦ m is presumed hard without knowledge of G. If the first user does have knowledge of G, then such first user can compute c ↦ mS via decoding the Goppa code word cP$^{-1}$ using G, and can then obtain m as S is invertible. Analogous systems employing parity check matrices rather than generator matrices and similar extension to digital signature schemes have also been proposed and are contemplated by the present invention.

It is, however, not entirely true that Ĝ is indistinguishable from a random matrix. Furthermore, such an encoding system is not semantically secure if it can be assumed that a problem underlying the system is hard. The present invention recognizes such deficiencies and via synchronizing an encoder and decoder of code generates a more robust system with better performance with respect to an adversarial attack. At 506 an encoder that encodes the code and a decoder that decodes the code are synchronized. Thus, if a sender desires to relay a sequence of messages $m_1, m_2, m_3, \ldots, m_i, m_{i+1}, \ldots, m_t$ to an authorized recipient, both the encoder and decoder will know a position within the sequence of each encoded/decoded message. The encoder can therefore generate a transmission utilizing an encoding function $f$ via sequentially encoding each message (e.g., $f(m_i)$).

At 508, pseudo random numbers a and b can be generated based at least in part upon i, where a and b are both n bits in length. A pseudo-random permutation σ can also be generated to permute n bits. Utilizing these pseudo random values the encoder can relay a×σ($f(m_i)$)+b over a channel to an authorized recipient, where × is a bitwise multiplication operator. The channel includes an adversary that attacks the encoded message with a vector v with Hamming weight w. The decoder thus receives a×σ($f(m_i)$)+b+v.

At 510, the encoded messages are decoded by a decoder. As described above with respect to FIG. 3, the decoder can determine a, b, and σ because the encoder knows a present value of i. Therefore the decoder can compute $f(m_i)+\sigma^{-1}(a^{-1} \times v)$, where $a^{-1}$ is a bitwise inverse of a. The vector $\sigma^{-1}(a^{-1} \times v)$ is a random vector chosen uniformly from all the length n vectors of weight w. As the attack can be seen as a random attack, a code designed in the noise model will have better performance than a corresponding code designed in the adversarial model.

Figure 6:
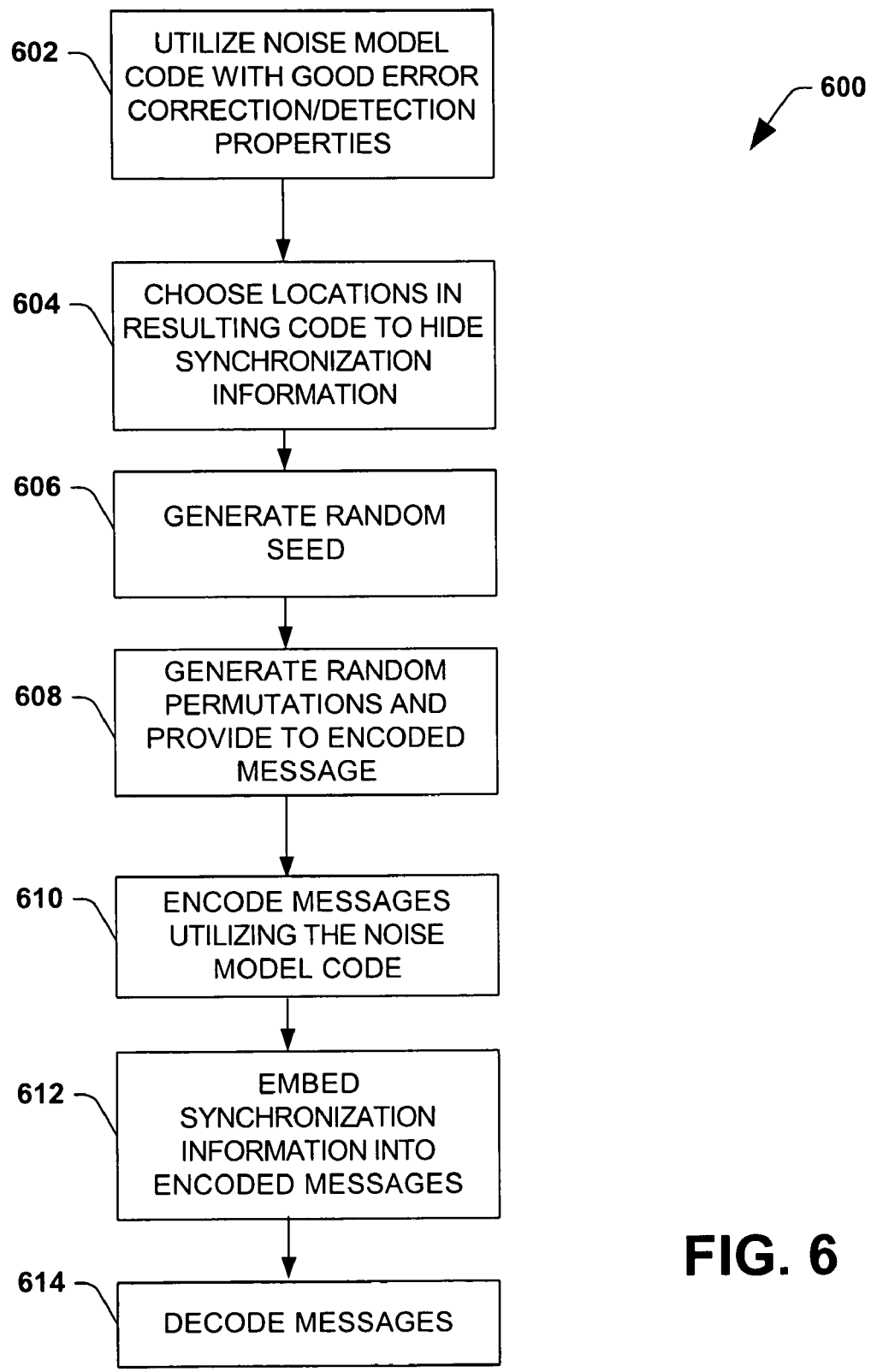
FIG. 6 is a representative flow chart of a methodology for hiding a code from a computationally bounded adversary in accordance with an aspect of the present invention.

Turning now to FIG. 6, a methodology 600 that facilitates hiding a data transmission from an adversary it illustrated. At 602, a noise model code that is associated with suitable performance with respect to error correction and detection in presence of random noise is selected. In accordance with one aspect of the present invention, the code is an efficient encodable and list-decodable code. A distance of the selected code is $n_l$. At 604 a number $n_l$ secret locations within the resulting encoded data is chosen to hide synchronization information. At 606 a random seed is generated by a pseudo-random number generator. At 608, the pseudo-random number generator can be employed to generate numbers a and b as well as a random permutation σ. At 610 a sequence of messages are encoded utilizing the selected code. For example, an encoding function $f$ can encode a plurality of messages m in accordance with the selected code. Utilizing the random seed as the input, the pseudo-random number generator can be employed to generate numbers a and b as well as a random permutation σ. Utilizing these pseudo random values the encoder can generate a code word a×σ($f(m_i)$)+b, where × is a bitwise multiplication operator. At 612, an encoding function can also encode the random seed with the code and place a resultant code word at the $n_l$ secret locations, wherein the $n_l$ secret locations are known to a decoder. The encoding function can thereafter relay resultant code words to a decoder for decoding. The channel can include an adversary that attacks the encoded message with a vector v with Hamming weight w. Furthermore, the encoding function itself can add small amounts of errors without disabling the code.

At 614, the code words are decoded, as the attack becomes essentially a random noise attack due to randomizing (and thus hiding) contents of the data delivered to the decoder. For example, the decoder can list decode code utilized to embed the synchronization information at the $n_l$ locations. Thus, the decoder can obtain a list of secret seeds and utilize each seed until a correct seed is determined. An incorrect seed will result in an unacceptable number of errors. Furthermore, it is to be noted that an adversarial attack can affect synchronization data encoded within the data transmission. However, code utilized to embed this synchronization data has a higher relative distance than a code utilized to encode the code words, and can thus receive a greater number of errors, as these errors can be corrected with a high probability.

Figure 7:
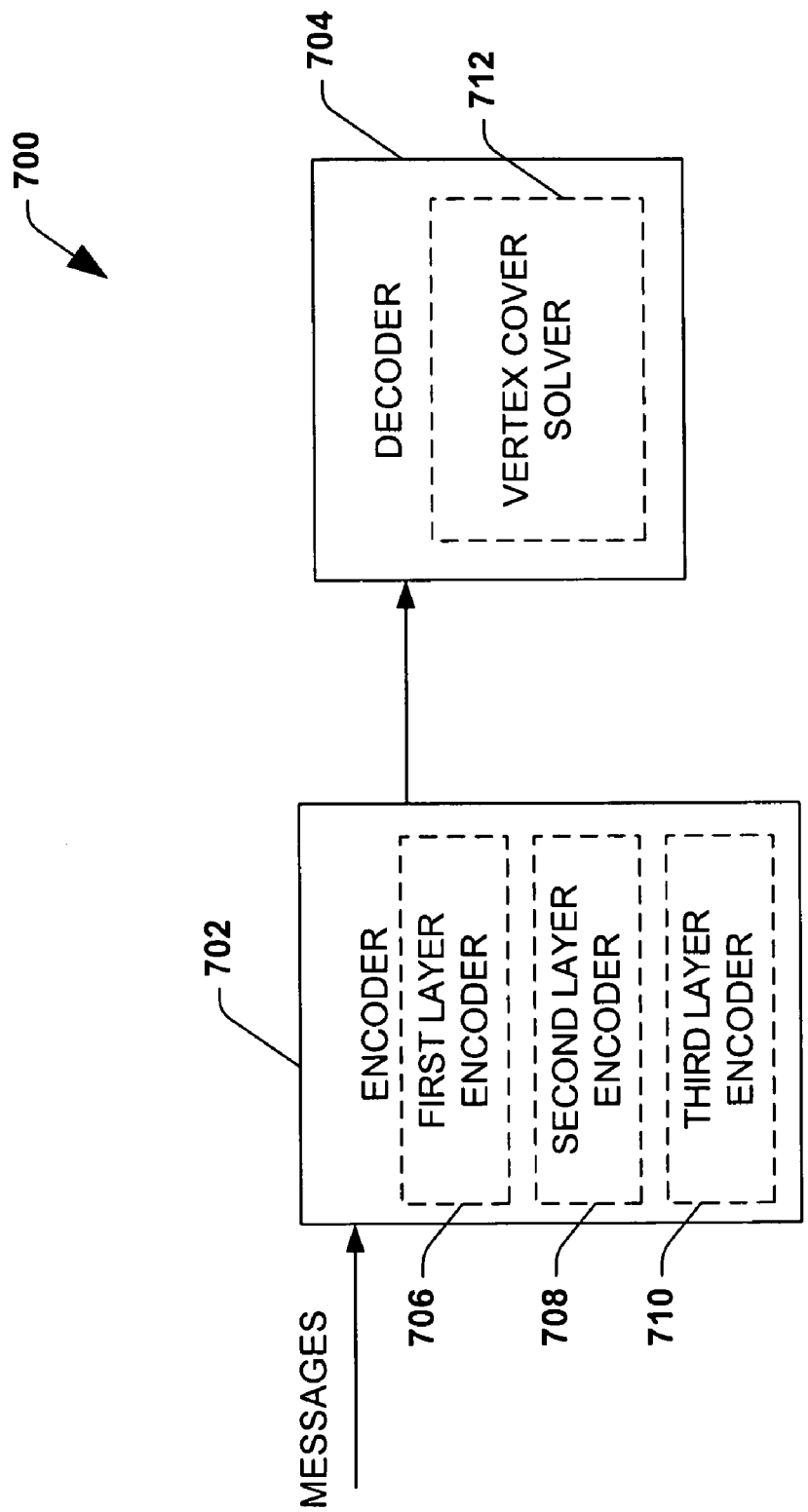
FIG. 7 is a block diagram of a system that describes efficient codes based on encoding methods in accordance with an aspect of the present invention.

Now referring to FIG. 7, an exemplary system that provides encoding and decoding of hidden code is illustrated. The system 700 includes an encoder 702 that receives one or more messages that are desirably relayed a decoder 704. In accordance with one aspect of the present invention, the messages are encoded in three layers. The first layer 706 can be any code with minimum relative distance $\epsilon$ and a rate of $1-\kappa\epsilon$ for some constant $\kappa>1$. A purpose of this layer is to correct a small fraction of layers that ensuing layers are unable to correct. One or more code words result from encoding the messages via the first layer 706. Thereafter, such code words are input into a second layer 708. The second layer divides a resultant code word into B blocks, wherein each block has a size k. In accordance with one particular aspect of the present invention, the code word can be encoded utilizing (n, k, n−k+1) Reed-Solomon code, resulting in B blocks of size n.

A third layer 710 can include a $C_4$-free bipartite expander graph with Bn number of edges. The $C_4$-free bipartite expander graph will have no parallel edges (e.g., no $C_2$). A bipartite graph is any graph whose vertices can be divided into two sets, such that there are no edges between vertices of the same set. A graph can be proved bipartite if there do not exist any circuits of odd length. An expander graph is a graph with high vertex or edge expansion. On one side of the $C_4$-free bipartite expander graph exists a set $V_L$ of B nodes each of degree n. On a disparate side the $C_4$-free bipartite expander graph exists a set $V_R$ of $$\frac{Bn}{d}$$

nodes each of degree d. Corresponding to each block with n symbols the graph has n edges. One edge can be assigned to each symbol randomly, and each node $u \in V_R$ has d of these edges incident upon the node. Thereafter the edges copy the assigned symbols to node u. Thus, $u \in V_R$ has a word of d symbols each of which is encoded as an element of an appropriate field.

The decoder 704 can decode the code words via solving a minimum vertex cover problem in hyper graphs (e.g., which is better known as a minimum set cover problem when one has equal sized sets). Corresponding to $u \in V_R$ there exists a vertex in a hypergraph. Hereafter every vertex $v \in V_L$ can be considered. For example, for each vertex v all possible k+1 symbols can be considered to determine whether such symbols are consistent. Consistency can be determined easily as Reed-Solomon codes are one of a MDS code. If inconsistency is present, it is known that one of the symbols has been corrupted. A hyperedge of size k+1 can be placed within the hypergraph corresponding to a set of nodes with inconsistent symbols in $V_R$. These hyperedges represent can be referred to as conflicts, and finding the minimum number of nodes in the hypergraph covering all the conflicts is the minimum vertex cover problem in hypergraphs. Accordingly, the decoder 704 includes a vertex cover solver 712.

In accordance with one aspect of the present invention, the vertex cover solver 712 can encode the vertex cover problem as an integer programming problem and take a standard LP relaxation. Rather than attempting to solve linear program, however, a simple heuristic can be employed to solve the vertex cover problem. For example, an expected number of conflicts a corrupted node creates is $$d\binom{n-1}{k},$$

assuming that a field size is sufficiently large. An expected number of conflicts a non-corrupted node creates is $$d\binom{n-1}{k}(1-(1-p)^k).$$

As described above, each edge of a conflict graph represents a conflict related to a corrupted node. Initially, the hypergraph is k+1-regular (e.g., all edges of the hypergraph have size k+1). As the corrupted nodes and the non-corrupted nodes are separated, however, edge sizes may alter. If a set of assumptions are made relating to the hypergraph are made, then the vertex cover problem can be solved via a relatively simple heuristic. First, for every edge all participating nodes are equally responsible for the conflict—each node in a hyperedge is equally likely to have been corrupted. This implies that for each edge of size s, each participating node is $$\frac{1}{s}$$

responsible. Second, each edge exists independently of other edges. The second assumption implies that a probability that a node a is a corrupted node is $$1 - \prod_{h:a \in h}\left(1 - \frac{1}{\text{size}(h)}\right),$$

where h denotes hyperedges. Likewise, a probability that a node a is not corrupted is $$1 - \prod_{h:a \in h}\left(1 - \frac{1}{\text{size}(h)}\right).$$

This quantity can be computed for every node, and a node that is least likely to be corrupted is chosen and declared non-corrupted. Edges relating to this node are reduced so that such edges are no longer incident upon the node. If a probability for a node to be non-corrupted goes to zero, it is chosen as corrupted and all edges incident upon this node are removed from the hypergraph.

In accordance with another aspect of the present invention, the vertex cover solver 712 can employ a simpler heuristic—locate all corrupted nodes in a single iteration utilizing the above algorithms. All nodes with a hyperdegree of at least $$d\binom{n-1}{k}\left(1-\frac{1}{q}-\varepsilon\right),$$

where $\varepsilon<(1-p)^k$ are picked as corrupted. In such an algorithm q represents a field size and p represents a particular constant bias that is associated with an attack on a particular data transmission. As q is typically very large and $\varepsilon$ is typically very small, they can generally be ignored. Utilizing these assumptions, a corrupted node will always be declared corrupted, but a small fraction of non-corrupted nodes may also be declared corrupted. A non-corrupted node will be declared corrupted in instances that all $$d\binom{n-1}{k}$$

potential conflicts materialize. More particularly, a neighbor on a right-hand side of a non-corrupted node has $$d\binom{n-1}{k}$$

potential conflicts. All such conflicts materialize if (n−k) neighbor nodes of all (n−1) neighbor nodes are corrupted. If an assumption is made that n−k>np+√n then a probability that a non-corrupted node will be declared corrupted is at most $e^{-\Omega(n)}$. Furthermore, any non-corrupted node on the right-hand side of the graph will have d neighbors. As an assumption has been made that the expander graph is $C_4$ free, all the d neighbors will have n different neighbors on the right-hand side of the graph (e.g., these d neighbors are independent of one another). Therefore a probability that a non-corrupted node will be declared corrupted is $e^{-\Omega(nd)}$. Utilizing Markov's inequality, a probability of obtaining a constant fraction of non-corrupted nodes as corrupted nodes is negligible. Therefore, with high probability a total number of corrupted nodes obtained is p+o(1). The underlying expander ensures that with an exception of a small fraction of left hand side blocks, all blocks receive p+o(1) fraction of errors. Thus, in an instance that $$\frac{k}{n} < 1 - p - o(1),$$

this code works with high probability (asymptotically, this is an optimal code).

Figure 8:
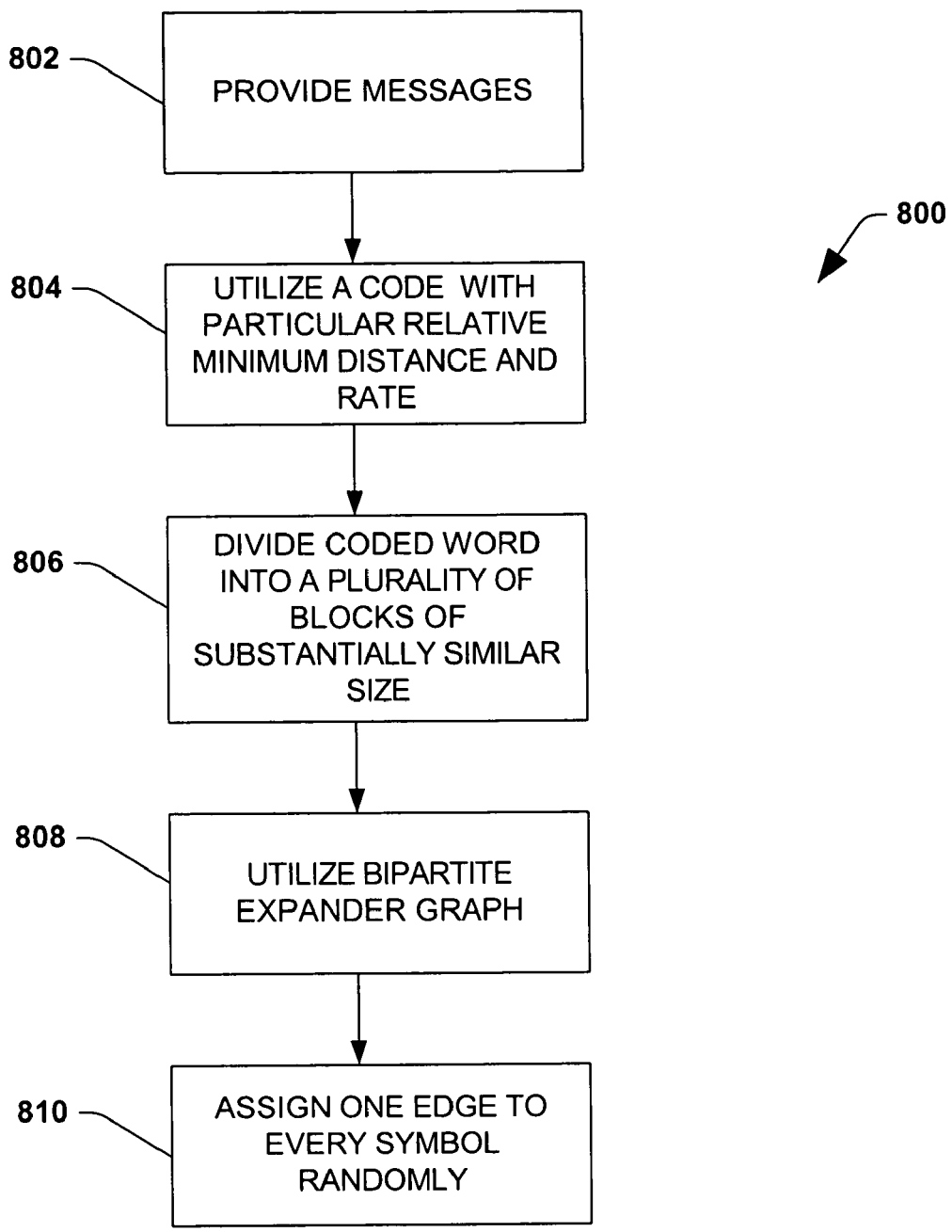
FIG. 8 is a representative flow chart of a methodology for encoding a data package in accordance with an aspect of the present invention.

Turning now to FIG. 8, an encoding methodology 800 that can be utilized in connection with the present invention is illustrated. At 802 a plurality of messages is provided to an encoding system. These messages are desirably encoded to provide for cryptographically secure transfer over a channel without sacrificing error correction/detection capabilities. At 804 a code with minimum relative distance $\varepsilon$ and a rate of 1−κ$\varepsilon$ for some constant κ>1 is utilized to encode one or more of the messages. At 806, a resultant code word from the previous code is divided into B blocks, each with size of k. In accordance with one aspect of the present invention, each block can be encoded utilizing a (n, k, n−k+1) Reed-Solomon code, resulting in B blocks of size n. At 806, a $C_4$-free bipartite expander graph can be utilized with Bn number of edges. On a left side of the graph a set $V_L$ of B nodes, each with degree n exists. On a right side of the graph a set $V_R$ of $$\frac{Bn}{d}$$

nodes of degree d is existent. Corresponding to each block with n symbols the graph can have n edges. At 808, one edge is assigned to each symbol randomly. Furthermore, each node $u \in V_R$ has d edges incident upon such node, and these edges copy the assigned symbols to node u. Thus, $u \in V_R$ has a word of d symbols each of which is encoded an element of an appropriate field.

Figure 9:
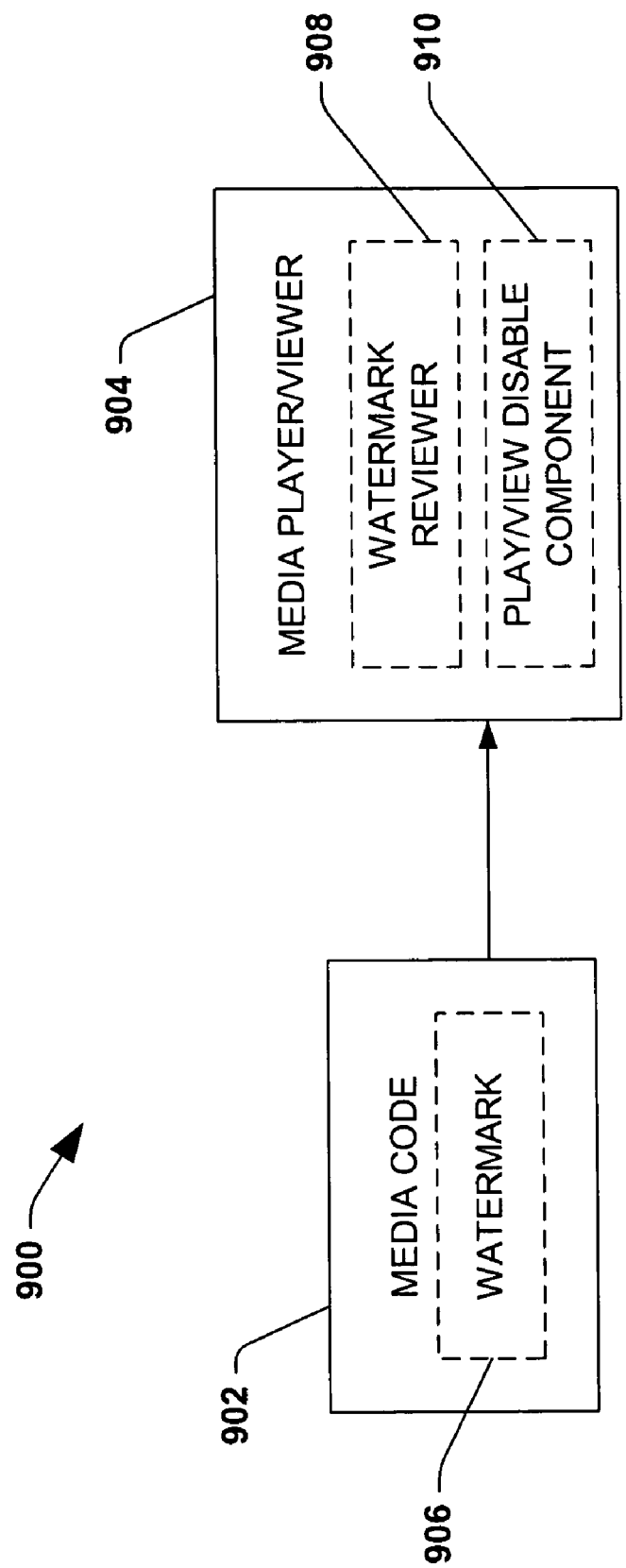
FIG. 9 is a block diagram of a system that facilitates protection of copyrighted materials in accordance with an aspect of the present invention.

Turning now to FIG. 9, an exemplary environment 900 in which one or more aspects of the present invention can be utilized is illustrated. A media file 902 that may be subject to copyright or other legal restriction is desirably received by a media player/viewer 904. For example, the media file 902 can represent music, a video, a particular image, an electronic book, or any other suitable media that may be subject to ownership and/or copyright restrictions. The media file 902 includes a watermark 906, wherein the watermark 906 includes information relating to a user's authority to use the media file 902. More particularly, the watermark 906 can indicate which user(s) and/or which machines are authorized to utilize the media file 902. Furthermore, the watermark 906 can include information relating to restrictions on use of the media file 902. For example, the watermark 906 can include information that tells the media player 904 to refuse a request to copy the media file 902. The media player 904 includes a watermark reviewer 908, which reads the watermark 906 and determines whether a current user is authorized to use the media file 902. The watermark reviewing component 908 is associated with a play/view disable component 910, which disables the media player 904 from taking particular actions with respect to the media file 902 when an unauthorized user is attempting to utilize the file 902.

Conventionally, attackers would destroy the watermark 906 via directing noise towards the watermark 906. Thus, the watermark reviewer 908 would be unable to read the watermark 906, and an unauthorized user could utilize the media file 902 in connection with the media player 904. The present invention, however, provides a defense against an attack on the media file 902. For example, utilizing the present invention code words can be randomized. Therefore, an unauthorized user would be unable to determine a location of the watermark 906, and thus would be unable to destroy such watermark 906. If the unauthorized user attempted to destroy the watermark 906 via utilizing a substantial amount of noise, such user would risk destroying an entirety of the media file 902. In accordance with another aspect of the present invention, a database (not shown) can include a list of unique watermarks that are indexed to a particular authorized user. Upon attempting to play, transfer, view, copy, etc. the media file 902, the watermark reviewer 908 can access the database and determine if a current user is the authorized user for the particular media file 902. Furthermore, if the current user is not authorized, the watermark reviewer 908 can query the database and determine an identity of the authorized user (e.g., the authorized user presumably colluded with another for illegal distribution of the media file 902).

Figure 10:
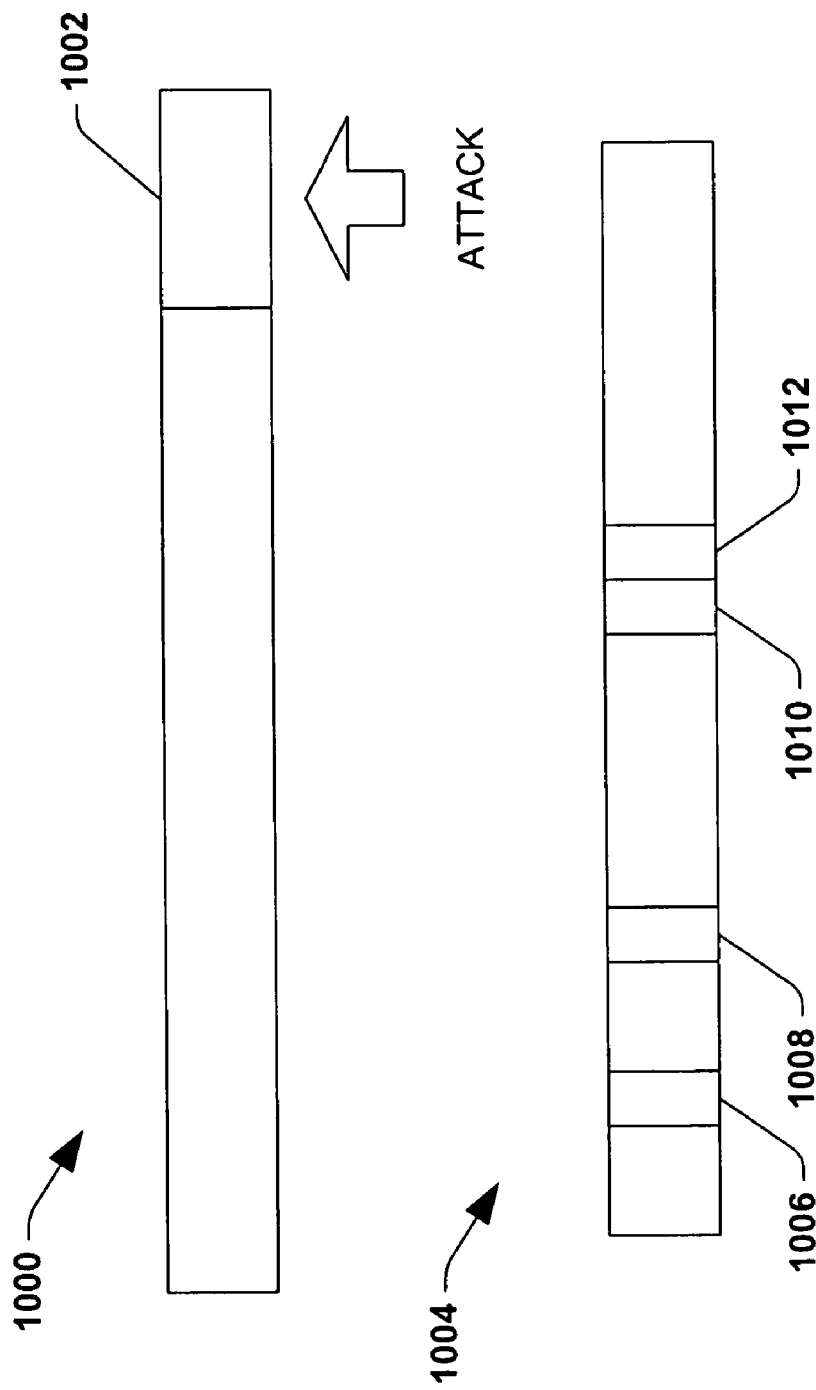
FIG. 10 illustrates an attack on a randomized code and results of the attack on a hidden code in accordance with an aspect of the present invention.

Now referring to FIG. 10, an exemplary adversarial attack on a randomized data package 1000 in accordance with an aspect of the present invention is illustrated. The adversarial attack is directed at a particular portion 1002 within the data package 1000. For example, an adversary could believe that the portion 1002 was a watermark that required destroying to enable the adversary to gain authorization to use the data package. Furthermore, the adversary could believe that the portion 1002 included various critical bits to flip that would destroy the data package 1000. Upon decoding the randomized package 1000, an underlying hidden package 1004 is determined. The adversarial attack that was directed at the portion 1002 of the randomized data package 1000 is actually a random vector distributed over various portions 1006-1012 of the hidden package 1004. Thus, codes designed with respect to noise attacks can be utilized when an adversary is resident without sacrificing error correction/detection performance. Furthermore, the present invention can be employed for cryptography purposes, thus obtaining benefits associated with codes designed with respect to an adversary.

Figure 11:
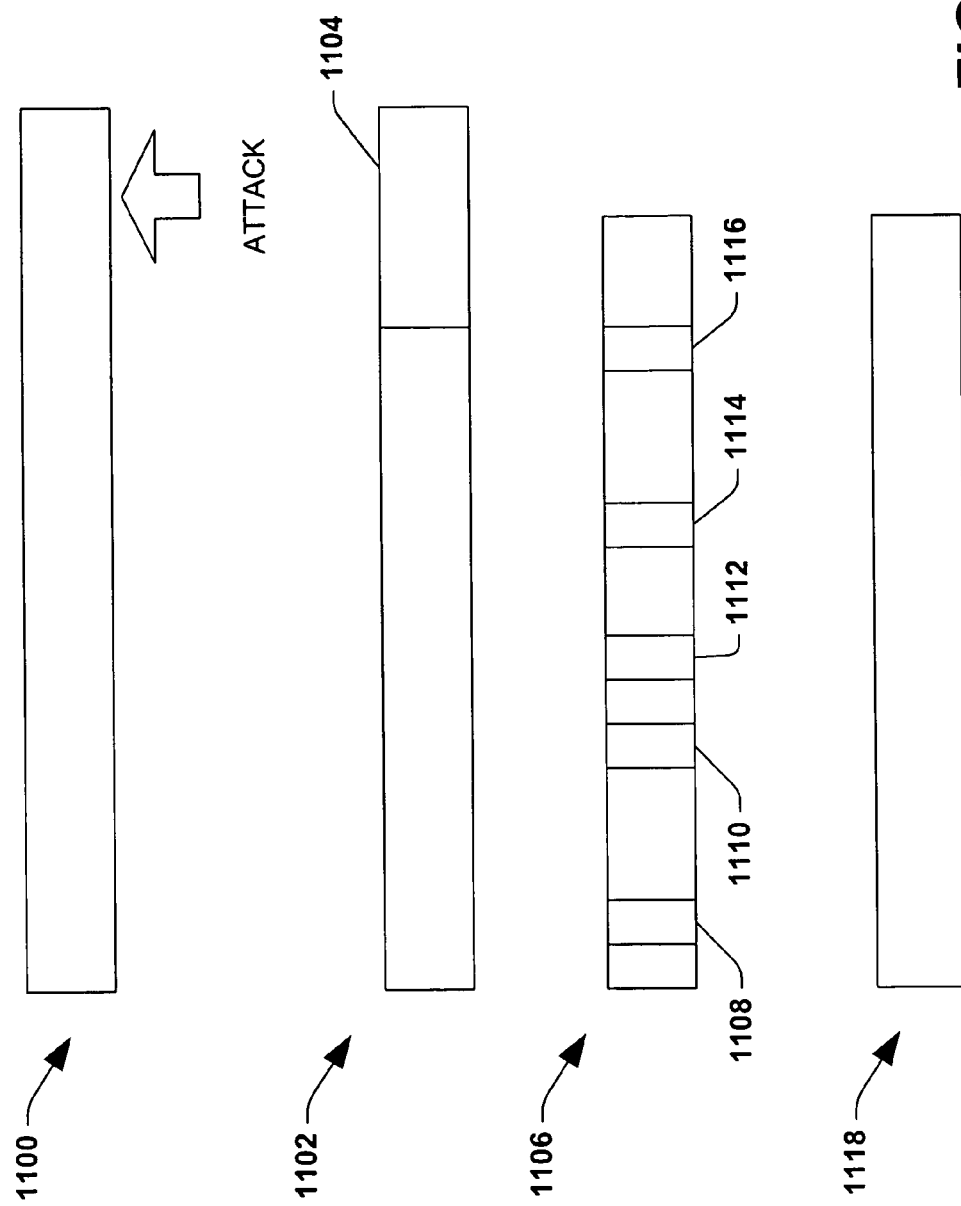
FIG. 11 illustrates an attack on a randomized code and results of the attack on a hidden code in accordance with an aspect of the present invention.

Turning now to FIG. 11, an exemplary adversarial attack on a randomized data package 1100 in accordance with an aspect of the present invention is illustrated. The adversarial attack is directed at a particular portion within the randomized data package 1100. An altered randomized data package 1102 is a result of the attack, wherein the attack has changed a particular portion 1104 of the randomized data package. After decoding the randomized package 1102, an underlying hidden package 1106 is determined. The adversarial attack that was directed at the portion 1104 of the randomized data package 1100 is actually a random vector distributed over various portions 1108-1116 of the hidden package 1106. Furthermore, because errors resulting from the attack are distributed, these errors can be detected and corrected with high probability. The resulting package 1118 without errors exists upon detection and correction of errors. Thus, it can be seen that the present invention improves upon both codes designed in the adversarial model and codes designed in the noise model. More particularly, codes designed in the noise model typically do not perform well given an adversarial attack. Rather, these codes perform optimally when only random noise distributed over an entirety of a data package is existent. Likewise, codes designed in an adversarial model typically do not have error correction/detection capabilities of codes designed in the noise model. Furthermore, codes designed in an adversarial model require data packages of greater length, as a greater minimum Hamming distance between code words is typically utilized.

Figure 12:
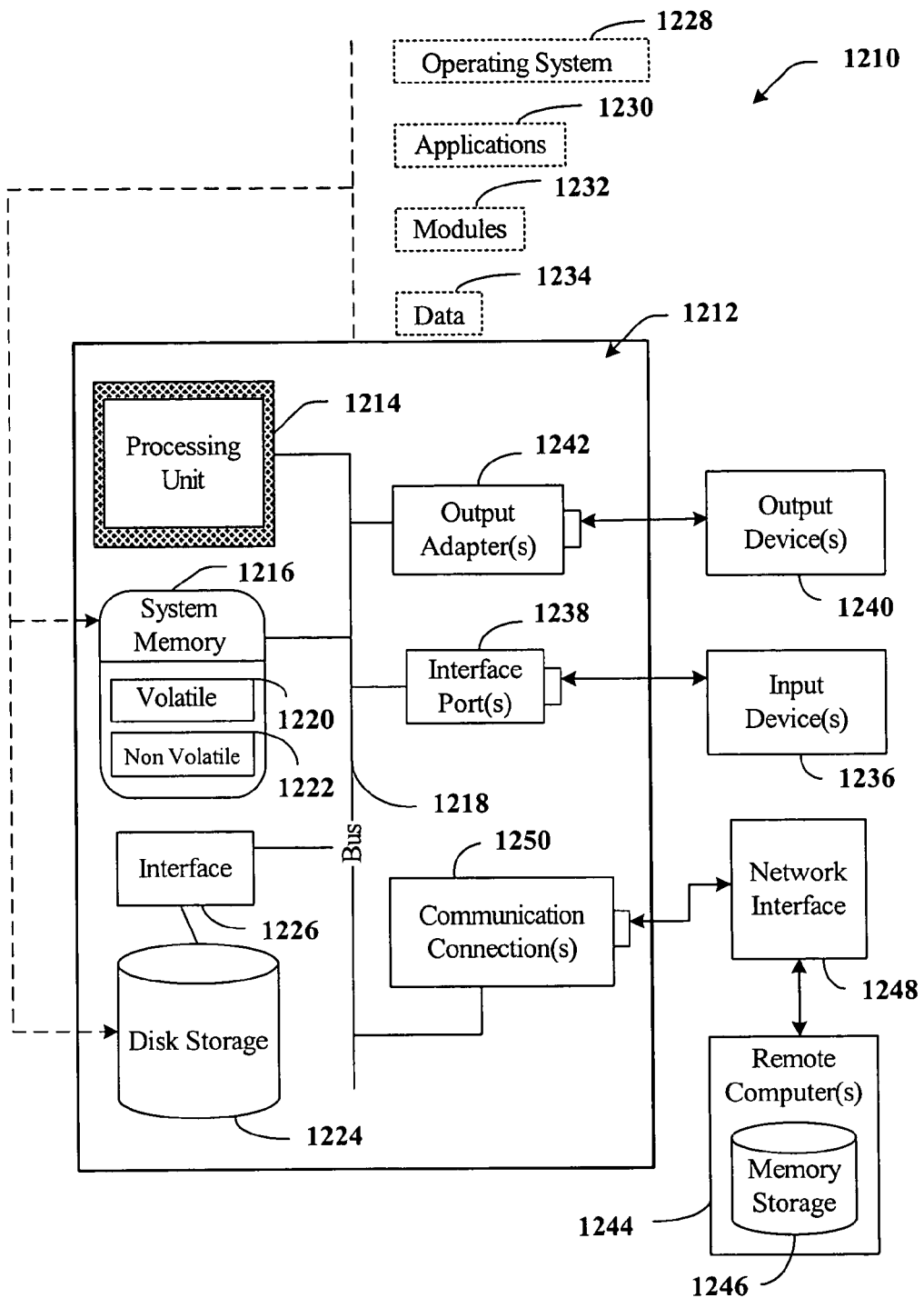
FIG. 12 illustrates an example operating environment in which the present invention may function.

With reference to FIG. 12, an exemplary environment 1210 for implementing various aspects of the invention includes a computer 1212. The computer 1212 can be any suitable computing device (e.g., a personal digital assistant, laptop computer, server, desktop computer, . . . ) The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
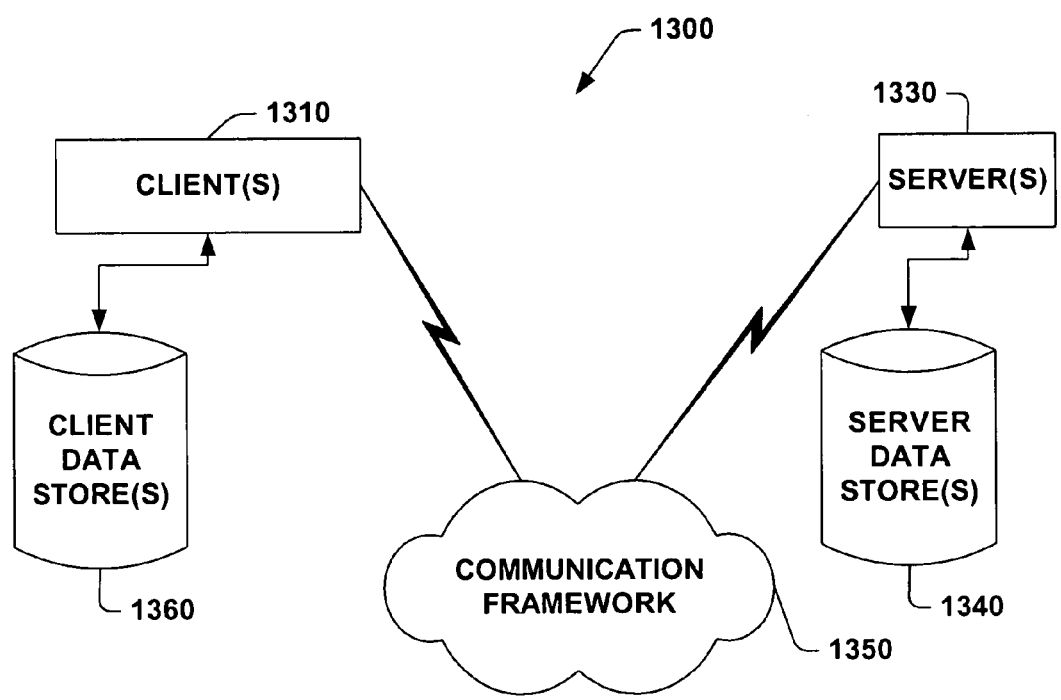
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates efficient code construction, comprising:
   a processor for executing the following components:
   a component that receives a first code designed in a noise model, the first code comprises algorithms utilized to correct noise errors with high probability, the first code is intended to refer to encoded data as well as error detection codes and includes a linear code, wherein the first code is generated based at least in part on a sequence of messages; and
   a transformation component that transforms the first code to a new code that has essentially same length parameters as the first code but is hidden to a computationally bounded adversary, the transformation component utilizes a random number generator to perform algebraic transformations on data utilizing the first code to generate the new code, and the transformation component hides the first code via randomizing data that employs the first code thereby not enabling the computationally bounded adversary to determine a location of critical bits to attack, wherein the new code acts as a protective wrapping of the first code, such that an attack on the new code by the computationally bounded adversary would appear as a noise attack on the first code, as the attack would be randomly distributed across the first code and not concentrated on a particular location within the first code, this allows the first code to act as it was designed to and utilize the algorithms to correct the noise errors with a high success rate;
   a decoder that determines the first code from the new code, the decoder accesses algorithms utilized by the transformation component to decode the new code and determine the first code, wherein the decoder knows the sequence of messages via the decoder being synchronized with the transformation component;
   a tracing component that determines whether a user accessing the first code is a valid user via a unique watermark associated with a particular user and embedded in the first code, wherein if the watermark does not correlate to an authorized user, access is denied; and
   a pseudo random number generator, the pseudo random number generator generates two pseudo random numbers a and b, each n number of bits, based upon a position within a sequence of one of the messages, and further generates a random permutation $\sigma$ that permutes the n bits.

2. The system of claim 1, the new code appears random to the computationally bounded adversary.

3. The system of claim 1, the transformation component comprises a pseudo-random number generator that facilitates transforming the first code into the new code.

4. The system of claim 1, the decoder comprising a checking component that determines whether the first code has been corrupted.

5. The system of claim 4, the checking component utilizing a checking function $h: \Sigma^n \to \{0,1\}$, where $\Sigma$ is a finite alphabet that defines a family of codes and n is a length parameter for $\Sigma$.

6. The system of claim 4, the checking component outputting a vector, the first code being corrupted when the vector is a non-zero vector.

7. The system of claim 1, the decoder utilizes a unique decoding function g, where $g(\tilde{c})=c$ when $$d(c, \tilde{c}) < \frac{d}{2},$$

and c is a code word, $\tilde{c}$ is code word c that has been altered, and d is a Hamming distance between any two code words.

8. The system of claim 1, the decoder utilizes a list decoding function g, where $g(\tilde{c})=L$, where $\tilde{c}$ is a codeword c that has been altered, and L is a list of code words that contain c.

9. The system of claim 1, the transformation component sends a randomized code word to the decoder, the randomized code word having the form $a \times \sigma(f(m_i))+b$, where $f$ is an encoding function, m is a message, i is the position of the message within the sequence, and × is a bitwise multiplication operator.

10. The system of claim 9, the transformation component embeds information relating to the sequence of messages into the new code.

11. The system of claim 10, the first code has a length of $n_l$, and the information relating to the sequence of messages embedded in $n_l$ locations in the new code.

12. The system of claim 11, an encoder sending the new code to the decoder, the new code having embedded therein the seed.

13. A system that hides a codeword from a computationally bounded adversary, comprising:
   a processor for executing the following components:
   a code generator that generates a first code designed in a noise model and based at least in part upon a sequence of messages that are desirably relayed to a receiver, the first code comprising algorithms utilized to correct noise errors with high probability;
   a code hiding module that creates a second code, the second code being a pseudo random version of the first code, the second code appears to be random to a computationally bounded adversary; and
   a decoder that determines the first code from the second code, wherein the decoder knows the sequence of messages via the decoder being synchronized with the code generator,
   wherein the second code acts as a protective wrapping of the first code, such that an attack on the second code by the computationally bounded adversary would appear as a noise attack on the first code, this allows the first code to utilize the algorithms to correct the noise errors;
   a tracing component that determines whether a user accessing the first code is a valid user via a unique watermark associated with a particular user and embedded in the first code; and
   a pseudo random number generator, the pseudo random number generator generates two pseudo random numbers a and b, each n number of bits, based upon a position within a sequence of one of the messages, and further generates a random permutation σ that permutes the n bits.

14. The system of claim 13, further comprising an encoding component that encodes a message and creates a code word, the encoding component encodes the message with a code that has a minimum relative distance ε and rate 1−κε for some constant κ>1.

15. The system of claim 14, further comprising a component that utilizes the encoded message and divides the encoded message into a number of blocks B, the B blocks being of substantially similar size.

16. The system of claim 15, the plurality of blocks encoded using (n, k, n−k+1) Reed-Solomon code, where n is a resulting size of the encoded blocks and k is a size of the blocks prior to encoding.

17. The system of claim 16, the code hiding module comprising a bipartite expander graph with a number of edges being substantially similar to Bn, and symbols within the B blocks are randomly assigned an edge within the bipartite expander graph.

18. The system of claim 13, the decoder comprises one or more algorithms that facilitate solving a minimum vertex cover problem.

19. The system of claim 13, further comprising a synchronization component that synchronizes the code generator with the decoder.

20. The system of claim 13, the code hiding module embeds synchronization information into the second code.

21. A method for hiding a data package from a computationally bounded adversary, comprising:
   receiving a message that is desirably transferred to an authorized user;
   encoding the message utilizing an encoding scheme designed in a noise model;
   algebraically transforming the encoded message into a first code, the first code rendered random to the unauthorized user and based at least in part upon a sequence of messages that are desirably relayed to a receiver, and the first code comprising algorithms utilized to correct noise errors;
   transforming the first code to a second code that has essentially same length parameters as the first code but is hidden to a computationally bounded adversary, wherein the second code acts as a protective wrapping of the first code, such that an attack on the second code by the computationally bounded adversary would appear as a noise attack on the first code;
   utilizing the algorithms of the first code to correct the noise errors;
   determining whether a user accessing the first code is a valid user via a unique watermark associated with a particular user and embedded in the first code; and
   generating two pseudo random numbers a and b, each n number of bits, based upon a position within a sequence of one of the messages, and further generating a random permutation a that permutes the n bits.

22. The method of claim 21, further comprising decoding the message, wherein the message is decoded at least in part by solving a minimum vertex cover problem.

23. The method of claim 21, further comprising embedding information into the first code relating to the message's position within a sequence of messages.

24. The method of claim 21, further comprising decoding the first code based at least in part upon knowledge of the message's position within a sequence of messages.

25. A system that facilitates efficient code construction, the system comprising:
   a memor; and
   a processor coupled to the memory, the processor configured to perform acts comprising:
   receiving a first code designed in a noise model and based at least in part upon a sequence of messages that are desirably relayed to a receiver, the first code comprises algorithms utilized to correct noise errors;
   transforming the first code into a second code, the second code appearing random to a computationally bounded adversary and having substantially similar length as the first code, the means for transforming utilizes a random number generator to perform algebraic transformations on data utilizing the first code to generate the second code;

decoding the second code to obtain the first code, wherein the means for decoding the second code is based at least in part upon knowledge of the message's position within a sequence of messages, wherein the second code acts as a protective wrapping of the first code, such that an attack on the second code by the computationally bounded adversary would appear as a noise attack on the first code;

utilizing the algorithms of the first code to correct the noise errors;

determining whether a user accessing the first code is a valid user via a unique watermark associated with a particular user and embedded in the first code; and generating two pseudo random numbers a and b, each n number of bits, based upon a position within a sequence of one of the messages, and further means for generating a random permutation $\sigma$ that permutes the n bits.

26. A computer storage media having computer executable instructions stored thereon which when executed by a processor perform acts comprising:

transform a first code into a second code, the second code being a pseudo-randomized version of the first code and having essentially a same length as the first code, the second code appearing truly random to a computationally bounded adversary, wherein the first code is designed in a noise model and comprises algorithms utilized to correct noise errors;

embed synchronization information into the second code, and wherein the second code acts as a protective wrapping of the first code, such that an attack on the second code by the computationally bounded adversary would appear as a noise attack on the first code;

utilize the algorithms to correct the noise errors;

determine whether a user accessing the first code is a valid user via a unique watermark associated with a particular user;

generate two pseudo random numbers a and b, each n number of bits, based upon a position within a sequence of one of the messages; and generate a random permutation $\sigma$ that permutes the n bits.

27. A computer storage media having a data structure stored thereon which when executed by a processor performs acts comprising:

receive a first code that is designed in a noise model;

transform the first code into a second code, the second code being a substantially similar size as the first code and appearing random to a computationally bounded adversary, wherein the second code acts as a protective wrapping of the first code, such that an attack on the second code by the computationally bounded adversary would appear as a noise attack on the first code;

embed synchronization information into the second code;

utilize algorithms to correct the noise errors;

embed a tracing component in the first code, the tracing component determines whether a user accessing the first code is a valid user via a unique watermark associated with a particular user;

generate two pseudo random numbers a and b, each n number of bits, based upon a position within a sequence of one of the messages; and generate a random permutation $\sigma$ that permutes the n bits.

* * * * *